US006142007A

United States Patent [19]

Yuze et al.

[11] Patent Number: 6,142,007

[45] Date of Patent: Nov. 7, 2000

[54] SHOCK SENSOR

[75] Inventors: Kazunori Yuze; Hiromi Kashiwakura, both of Yokohama, Japan

[73] Assignee: Nippon Aleph Corporation, Japan

[21] Appl. No.: 09/095,725

[22] Filed: Jun. 11, 1998

[30] Foreign Application Priority Data

Jun. 11, 1997 [JP] Japan .................................... 9-153940

[51] Int. Cl.[7] .................................................... G01M 13/00

[52] U.S. Cl. ............................................................. 73/11.04

[58] Field of Search ................................ 73/12.01, 12.04, 73/12.09, 12.14, 651, 778, 844, 514.16, 514.21, 514.22, 514.23, 514.24, 514.29; 200/61.48, 61.51; 335/151, 152, 154, 158, 160, 161

[56] References Cited

U.S. PATENT DOCUMENTS

| | | | |
|---|---|---|---|
| 3,622,926 | 11/1971 | Risk . | |
| 3,781,496 | 12/1973 | Jones, Sr. | 200/61.51 X |
| 4,311,891 | 1/1982 | Faust | 200/61.48 X |
| 4,608,468 | 8/1986 | Bai | 200/61.51 X |
| 4,686,335 | 8/1987 | Grant | 200/61.51 X |
| 4,877,927 | 10/1989 | Reneau . | |
| 4,980,526 | 12/1990 | Reneau . | |
| 4,987,276 | 1/1991 | Radar et al. . | |
| 5,194,706 | 3/1993 | Reneau . | |
| 5,212,357 | 5/1993 | Reneau . | |
| 5,233,141 | 8/1993 | Breed | 200/61.51 X |
| 5,326,945 | 7/1994 | Gotoh et al. . | |
| 5,415,026 | 5/1995 | Ford | 73/651 |
| 5,416,293 | 5/1995 | Reneau . | |
| 5,440,084 | 8/1995 | Fuse et al. . | |
| 5,457,293 | 10/1995 | Breed | 200/61.51 X |
| 5,770,792 | 6/1998 | Kakada et al. | 73/12.01 |

FOREIGN PATENT DOCUMENTS

| | | |
|---|---|---|
| 35 09 054 | 4/1986 | Germany . |
| 8-221665 | 8/1996 | Japan . |

*Primary Examiner*—Benjamin R. Fuller
*Assistant Examiner*—Jewel V. Thompson
*Attorney, Agent, or Firm*—Sterne, Kessler, Goldstein & Fox, P.L.L.C

[57] ABSTRACT

The present invention provides a small and simple shock sensor which can be easily assembled. The shock sensor includes a hermetically sealed case extending along a direction substantially perpendicular to the direction in which a shock is to be detected and a fixed reed and a movable reed sealed inside the hermetically sealed case so as to extend in the lengthwise direction thereof. The movable reed is formed of a weight member and a supporting member which elastically supports the weight member. The shock sensor is structured so that when the weight member moves in the detected direction due to a shock, the contact of the tip of the weight member presses against the contact of the tip of the fixed reed and closes the space between the fixed reed and the movable reed.

23 Claims, 3 Drawing Sheets

SHOCK SENSOR

BACKGROUND OF THE INVENTION

1. Field of the Invention

The present invention relates to a shock sensor for activating airbag and seatbelt systems by detecting the shock given to a car body upon, for example, automobile accidents or the like.

2. Related Art

Conventionally, shock sensors using, for example, magnetic reed switches were often used as shock sensors of this type and were structured, for example, as shown in FIG. 10.

That is, a conventional shock sensor 1 in FIG. 10, which may be installed in the body of an automobile, is constructed of a case 2, a hollow cylindrical tube 3 placed so as to extend along the direction in which the shock is to be detected (e.g. forward and backward direction ofthe automobile) within case 2, a magnetic reed switch 4 inserted into the left area within tube 3, an annular magnet 5 movably attached along the lengthwise direction of tube 3, and a spring 6 for applying force to magnet 5 in the rightward direction in FIG. 10.

The two connecting terminals of magnetic reed switch 4 are connected to an adequately structured detection circuit via lead wires not shown.

According to shock sensor 1 constructed as above, when an automobile or the like which has shock sensor 1 installed therein is still or running at an ordinary speed, magnet 5 is pressed against the right end of tube 3 by the tension of the spring. Ordinary acceleration ofthe automobile will not greatly affect shock sensor 1. Therefore, magnet 5 is separated apart from magnetic reed switch 4 inserted into the left area within tube 3. Thus, magnetic reed switch 4 is in the "off" position as it is uninfluenced by the magnetic force of magnet 5.

From this state, for example, if an automobile suddenly stops due to an accident or the like which occurred while such automobile was running and a shock is given thereby, magnet 5 is subject to a relatively large negative acceleration since shock sensor 1 is suddenly stopped from a condition wherein it was moving in the leftward direction as shown with the arrow in FIG. 10. Therefore, magnet 5 will be subject to inertial force facing relatively in the leftward direction in relation to tube 3 pursuant to the inertial mass thereof.

The inertial force moves magnet 5 leftward while resisting the tension of spring 6. When the magnetic force of magnet 5 acting on the contact of magnetic reed switch 4 becomes larger than a prescribed value, the contact of magnetic reed switch 4 is switched to the "on" position by the magnetic force of magnet 5. If the shock is large enough, magnet 5 continues moving leftward and stops when spring 6 reaches a completely compressed position. The kinetic energy accumulated on magnet 5 up to this point is temporarily converted to deformation or vibrational energy of spring 6 or case 2 and is subsequently reconverted to kinetic energy of magnet 5 when magnet 5 reverses its direction.

Thereafter, when the acceleration of magnet 5 becomes less than a prescribed value by the automobile or the like coming to a halt, magnet 5 is unable to resist the tension of spring 6 and moves rightward on tube 3 pursuant to the tension of spring 6 and is returned to its original position. When the magnetic force of magnet 5 acting on the contact of magnetic reed switch 4 becomes less than a prescribed value, the contact of magnetic reed switch 4 is switched back to the "off" position.

Thus, magnetic reed switch 4 maintains the "on" position only during the period when it is switched to the "on" position until it is switched back to the "off" position. This "on" position is detected by the connected detection circuit thereby activating the airbag and seatbelt systems. Thus, the safety of automobile passengers is secured.

However, in shock sensor 1 with this type of construction, numerous parts are necessary which lead to increased costs for shock sensor 1. Moreover, numerous steps required for assembly result in decreased productivity and increased production costs.

A further problem with conventional shock sensor 1 as depicted in FIG. 10 is that the overall size is large due to the existence of movable magnet 5.

Additional conventional shock sensors are disclosed, for example, in Japanese Patent Laid Open Publication No. Hei 8 (1996)-221665 and Japanese Patent Laid Open Publication No. Hei 9 (1997)-35598.

The shock sensor according to Japanese Patent Laid Open Publication No. Hei 8 (1996)-221665 detects vibrations generated upon glass and metals being destroyed and the shock sensor according to Japanese Patent Laid Open Publication No. Hei 9(1997)-35598 detects the tilting of objects.

SUMMARY OF THE INVENTION

In consideration of the above points, an object of the present invention is to provide a simple and small shock sensor which can be easily assembled.

According to the present invention, the above objective is achieved by a shock sensor including a hermetically sealed case extending along a direction substantially perpendicular to the direction in which the shock is to be detected and a fixed reed and movable reed which are sealed inside the hermetically sealed case so as to extend in the lengthwise direction thereof. The movable reed is comprised of a weight member and a supporting member which elastically supports the weight member. When the weight member moves in the detected direction due to a shock, the contact ofthe tip thereof presses against or estranges from the contact of the tip of the fixed reed, thereby closing or opening the space between the fixed reed and the movable reed.

In a shock sensor according to the present invention, the contact where the fixed reed and the movable reed are to be pressed against each other is preferably placed in a position off-center in relation to the lengthwise direction of the hermetically sealed case.

In a shock sensor according to the present invention, the supporting member is preferably formed of a spring.

In a shock sensor according to the present invention, the supporting member is preferably integral with the base of the movable reed which is fixed and held by the hermetically sealed case.

In a shock sensor according to the present invention, the surface of the weight member is preferably structured as a contact.

In a shock sensor according to the present invention, the supporting member supporting the weight member is preferably structured as a contact.

In a shock sensor according to the present invention, the contact of the weight member is preferably either normally pressed against the contact of the fixed reed or normally estranged from the contact of the fixed reed.

In a shock sensor according to the present invention, the fixed reed may comprise two fixed reeds comprising contacts placed at prescribed intervals, and when the weight member ofthe movable reed moves in the detected direction due to a shock, the contact member fitted at the tip thereof estranges from the contact of one of the fixed reeds and presses against the contact of the other fixed reed.

In a shock sensor according to the present invention wherein the fixed reed comprises two fixed reeds, the weight member and one of the fixed reeds are preferably made of a magnetic material while the other fixed reed is made of a nonmagnetic material.

In a shock sensor according to the present invention, a coil may be placed around the lengthwise axis of the hermetically sealed case so as to encircle the hermetically sealed case, and pursuant to the magnetic force generated to the coil by providing an electric current to such coil, testing may be performed by making the contact of the movable reed estrange from or press against the contact of the fixed reed.

In a shock sensor according to the present invention, preferably, at least the contact of the fixed reed is made of a nonmagnetic material.

In a shock sensor according to the present invention, an excitation coil may be placed at the outside of the hermetically sealed case adjacent to the contact of the movable reed, thereby enabling testing by providing an electric current to this excitation coil and magnetically exciting the movable reed.

In a shock sensor according to the present invention, preferably, the hermetically sealed case is installed in a reed frame and, by being covered with a resin mold, the entirety is structured as a package.

According to the above construction, if the shock sensor is installed, for example, in the body or the like of an automobile and the shock sensor is suddenly stopped, the movable reed moves toward the direction of the shock with certainty by inertial mass of the weight member or, more preferably, by elastic deformation of the supporting member formed of a spring, and by the contact of the tip thereof being pressed against or estranged from the contact of the opposing fixed reed, the "on"-"ofF" between the fixed reed and the movable reed is switched.

Therefore, control devices of airbag, seatbelt, or similar systems detect the switching between the "on" or "off" position between the fixed reed and the movable reed, thereby detecting that the automobile has been subjected to a shock and activate the airbag or seatbelt system.

The structure ofthe present invention comprises only a hermetically sealed case, a fixed reed, and a movable reed. Therefore, few parts are required and the cost of parts and the assembly thereof is reduced. Furthermore, by appropriately selecting the weight of the weight member and the elastic modulus of the supporting member, a desired detection acceleration may be easily set.

The contact position where the fixed reed and the movable reed are to be pressed against each other may be placed at a position off-center in relation to the lengthwise direction ofthe hermetically sealed case, together with the length ofthe supporting member necessary for movement being secured, such that the length of the movable reed and the length of the entire shock sensor may be shortened.

The supporting member may be integrally formed with the base of the movable reed in order to further reduce the cost of parts and the assembly thereof since even fewer parts would be required.

The contact may be formed on a surface of the weight member or a supporting member which supports the weight member, such that the entire contact of the weight member and the supporting member could be shortened with a small diameter, which would enable the entire shock sensor to be smaller. Moreover in such case, the weight member would be positioned at the tip of the movable reed and, therefore, the movement of the weight member due to a shock would be performed effectively.

The fixed reed may be constructed as two fixed reeds comprising contacts placed at prescribed intervals. In such a construction, the weight member of the movable reed moves in the detected direction due to a shock and the contact member fitted at the tip thereof estranges from the contact of one of the fixed reeds and contacts the contact of the other fixed reed. One of the fixed reeds is utilized as a normally-closed contact and the other fixed reed as a normally-open contact. Therefore, a single shock sensor may be used as a normally-closed type or a normally-open type. Moreover, two levels of acceleration are detected since the movable reed estranges from one of the fixed reeds when the acceleration due to a shock exceeds a first value and the movable reed contacts the other fixed reed when the acceleration due to a shock exceeds a second value.

The weight member and one of the fixed reeds may be made of a magnetic material and the other fixed reed made of a nonmagnetic material, or at least the contact of the fixed reed made of a nonmagnetic material, such that the shock sensor will not be easily influenced by an outer magnetic field since a magnetic path will not be formed between the movable reed and the fixed reed which is made of a nonmagnetic material.

A coil may be placed around the lengthwise axis of the hermetically sealed case so as to encircle the hermetically sealed case so that testing may be performed by making the contact of the movable reed estrange from or press against the contact of the fixed reed pursuant to the magnetic force generated to the coil by providing an electric current to such coil. Alternatively, an excitation coil may be placed at the outside of the hermetically sealed case adjacent to the contact of the movable reed so as to enable testing by providing an electric current to this excitation coil and magnetically exciting the movable reed, for inspection of the finished product and the confirmation of the features thereof upon installation in an automobile. Furthermore, the testing of the opening and closing motions of the contacts may also be conducted with ease by such electric current.

The entire shock sensor may be easily mounted directly onto the surface of the printed board by installing the hermetically sealed case in a reed frame or by directly soldering the lead wire and covering it with resin mold.

The weight member of the shock sensor of the present invention is capable of moving in the detected direction due to a shock added to the vehicle upon an accident. The shock sensor of the present invention preferably detects shocks between approximately 1 G to 150 G.

The present invention is a system for protecting a driver and/or a passenger in a vehicle. The system comprises a shock sensor including a hermetically sealed case extending along a direction substantially perpendicular to the direction in which the shock is to be detected, and a fixed reed and a movable reed which are sealed inside the hermetically sealed case so as to extend in the lengthwise direction thereof. The movable reed comprises a weight member and a supporting member which elastically supports the weight member. When the weight member moves in the detected direction due to a shock, the contact of the tip thereof presses against or estranges from the contact of the tip of the fixed reed, thereby closing or opening the space between the fixed reed and the movable reed.

This system for protecting a driver and/or a passenger may further comprise a detection device which detects the switching to the closing or opening between said fixed reed and movable reed and is activated upon the detection device detecting such switching.

DETAILED DESCRIPTION OF THE PREFERRED EMBODIMENTS

Figure 1:
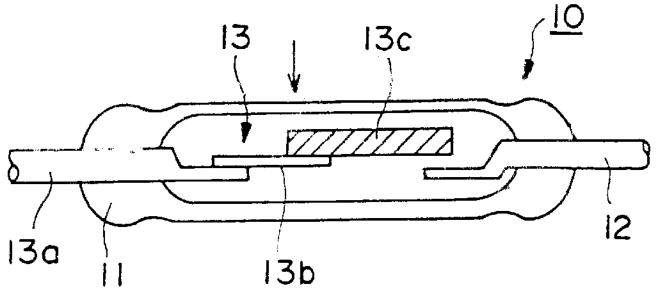
FIG. 1 is a sectional view illustrating a first embodiment of the shock sensor according to the present invention.

The present invention will now be explained in detail pursuant to the embodiments illustrated in the drawings.

FIG. 1 illustrates a first embodiment of the shock sensor according to the present invention. In FIG. 1, a shock sensor 10 includes a hermetically sealed case 11 extending along the direction substantially perpendicular to the direction in which the shock is to be detected (downward direction in the drawing). A fixed reed 12 and a movable reed 13 are sealed inside hermetically sealed case 11 so as to extend in the lengthwise direction thereof.

The connecting terminals offixed reed 12 and movable reed 13 protruding to the outside from hermetically sealed case 11 are connected respectively to a detection circuit via lead wires not shown.

Hermetically sealed case 11 is formed as a hollow cylindrical shape extending leftward and rightward in the drawing. Hermetically sealed case 11 is preferably made of glass, but it may also be made of other nonmagnetic materials or a resin material.

Furthermore, in order to prevent oxidation and moisture condensation of fixed reed 12 and movable reed 13 sealed inside hermetically sealed case 11, air may be removed from hermetically sealed case 11 so as to create a vacuum inside. Alternatively, an inert gas such as nitrogen gas or argon gas may be sealed within hermetically sealed case 11. However, it will suffice to merely seclude the inside from the outer air by simply hermetically sealing it without drawing a vacuum or filling it with inert gas. If inert gas is sealed within hermetically sealed case 11, hydrogen may be mixed with such inert gas so as to obtain a contact resistance stabilization effect by the oxidation prevention of the contacts.

Fixed reed 12 comprises a contact (not shown) at the tip thereof which is positioned within hermetically sealed case 11, and this contact is designed to reduce contact resistance by applying, for example, gilt of noble metals thereto.

According to FIG. 1, movable reed 13 comprises a base 13*a* which is fixed and held by the hermetically sealed case 11, a supporting member 13*b* which is fitted at the tip of base 13*a* and positioned within hermetically sealed case 11, and a weight member 13*c* which is fitted at the tip of supporting member 13*b*. A contact (not shown) is formed on the surface near the tip of weight member 13*c* in the area opposing the contact of fixed reed 12.

Supporting member 13*b* elastically supports weight member 13*c* and is a spring such as a wire spring or a plate spring or the like made from the likes of stainless steel or phosphor bronze. Supporting member 13*b* is structured as a so-called normally-open type, wherein the contact of weight member 13*c* is normally estranged from the contact of fixed reed 12. When acceleration is added in the direction shown with the arrow in FIG. 1, weight member 13*c* moves in the direction of the acceleration due to the inertia by such acceleration, and the contact thereof is pressed against the contact of fixed reed 12.

Shock sensor 10 according to the present invention is structured as mentioned above and, when utilized, is installed in advance in the body of automobiles. When the automobile is still, running at an ordinary speed, or subject to the normal accelerations inherent in driving a vehicle, the forces will not affect shock sensor 10 sufficiently to move weight member 13*c* into contact with the contact of fixed reed 12. Therefore, under normal operating conditions, weight member 13*c* is in a position estranged from the contact of fixed reed 12 as shown in FIG. 1. Therefore, since the space between fixed reed 12 and movable reed 13 is open, shock sensor 10 is in the "off" position.

From this position, if an automobile suddenly stops due to an accident or the like which occurs while such automobile is running and a shock (e.g. a shock of approximately 1 G to 150 G) is created thereby, movable reed 13 is subject to a relatively large negative acceleration in the direction shown with the arrow since shock sensor 10 is suddenly stopped from the state wherein it was moving downward as shown with the arrow in FIG. 1. Therefore, movable reed 13 is subject to inertial force directed downward pursuant to the inertial mass of weight member 13*c*. Thus, weight member 13*c* moves downward while overcoming the resisting tension of supporting member 13*b*, and the contact thereof is pressed against the contact of fixed reed 12. Thereby, since the space between fixed reed 12 and movable reed 13 is closed, shock sensor 10 is switched to the "on" position.

Thereafter, when the acceleration of weight member 13*c* falls below a prescribed value by the automobile coming to a halt, weight member 13*c* becomes unable to resist the tension of supporting member 13*b* and returns to the original open position shown in FIG. 1 pursuant to the tension of supporting member 13*b*. The contact of weight member 13*c* is thus estranged from the contact of fixed reed 12 and, since the space between fixed reed 12 and movable reed 13 is open, shock sensor 10 is switched back to the "off" position.

In addition, weight member 13*c* is placed at the tip of movable reed 13 so as to increase the inertial mass and, upon being subject to acceleration, is more certainly capable of moving.

Moreover, the detection function of acceleration, in other words, the size of acceleration for which movable reed 13 is able to press against fixed reed 12, is appropriately set in accordance with the elastic modulus and the length, that is, the spring constant of supporting member 13*b*, and the weight of weight member 13*c*.

Thus, shock sensor 10 is maintained in the "on" position only during the above-mentioned switch to the "on" position until the acceleration is sufficiently reduced such that it returns to the "off" position. The "on" position is detected by the detection circuit (not shown) connected to fixed reed 12 and movable reed 13, thereby activating the airbag and seatbelt systems which secure the safety of automobile passengers.

In such case, the reliability of closing fixed reed 12 and movable reed 13 is increased by gilding the contacts of fixed reed 12 and movable reed 13 with noble metals and creating a vacuum or sealing an inert gas within hermetically sealed case 11.

Furthermore, since the movable portion of movable reed 13 comprises a a supporting member 13*b* and a weight member 13*c*, the entirety may be formed short with a small diameter.

Moreover, since movable reed 13 is a so-called off-center type wherein weight member 13*c* is placed off-center in relation to the lengthwise direction, the length of supporting member 13*b* may be secured and the total length of the lengthwise direction may be shortened.

Figure 2:
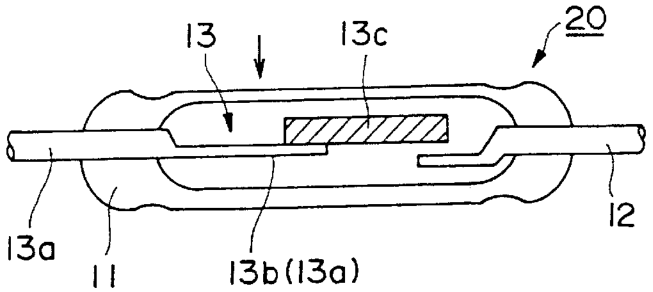
FIG. 2 is a sectional view illustrating a second embodiment of the shock sensor according to the present invention.

FIG. 2 illustrates a second embodiment of a shock sensor according to the present invention. In FIG. 2, a shock sensor 20 is a variation of shock sensor 10 shown in FIG. 1. The structure only differs regarding supporting member 13*b* being integrally formed with base 13*a* in relation to movable reed 13 in shock sensor 10. Otherwise and functionally, shock sensor 20 is the same as the shock sensor 10 shown in FIG. 1.

Figure 3:
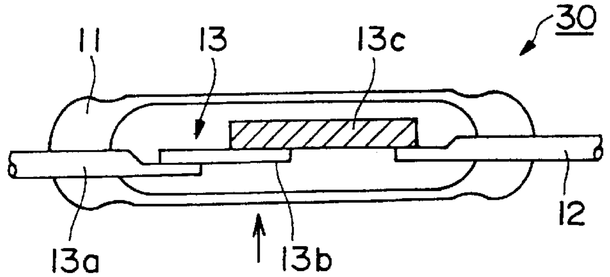
FIG. 3 is a sectional view illustrating a third embodiment of the shock sensor according to the present invention.

FIG. 3 illustrates a third embodiment of a shock sensor according to the present invention. In FIG. 3, a shock sensor 30 has substantially the same structure as shock sensor 10 shown in FIG. 1. The structure differs in that it is constructed as a so-called normally-closed type wherein the contact of movable reed 13 is normally pressed against the contact of fixed reed 12. When subject to an acceleration in the direction shown with the arrow in FIG. 3, the contact of movable reed 13 estranges from the contact of fixed reed 12 and the space between fixed reed 12 and movable reed 13 becomes open.

In this embodiment, when fixed reed 12 and movable reed 13 are made of a magnetic material, a shock sensor resistant to vibrations may be obtained since the space between fixed reed 12 and movable reed 13 will not easily open due to vibrations. Furthermore, when fixed reed 12 and movable reed 13 are made of a magnetic material, there is a possibility that the normally-open type shock sensor of FIG. 1 may close upon being affected by a strong magnetic field from the outside, but a normally-closed type will not be easily influenced by such outside magnetic field. Moreover, the moving distance of the contact until detection is shorter and the response is faster in the normally-open type shock sensor than in the normally-closed type.

Furthermore, when fixed reed 12 is made of a nonmagnetic material, even though a portion of movable reed 13 is made of a magnetic material, fixed reed 12 and movable reed 13 do not form a magnetic circuit. Therefore, even though a strong magnetic field is acting from the outside, the space between fixed reed 12 and movable reed 13 will not be forced to the closed state, thus enabling the opening with certainty upon being subject to a shock.

Figure 4:
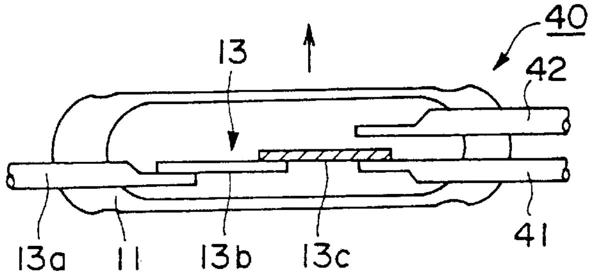
FIG. 4 is a sectional view illustrating a fourth embodiment of the shock sensor according to the present invention.

FIG. 4 illustrates a fourth embodiment of the shock sensor according to the present invention. In FIG. 4, the structure of a shock sensor 40 differs from shock sensor 10 shown in FIG. 1 in that fixed reed 12 of FIG. 1 comprises two fixed reeds 41 and 42. In this embodiment, fixed reeds 41 and 42 are structured respectively as a normally-open contact and a normally-closed contact. The normally-open contact 41 is formed of a nonmagnetic material and the normally-closed contact 42 is formed of a magnetic material.

Moreover, the contacts at the tip of the two fixed reeds 41 and 42 are placed so as to mutually possess gaps larger than the size of the thickness of the contact of weight member 13*c* of movable reed 13. The contact of weight member 13*c* of movable reed 13 is normally pressed against normally-closed contact 41 and, upon being subject to a shock, is designed so that weight member 13*c* is pressed against normally-open contact 42 due to the inertial force by the acceleration thereof Shock sensor 40 with this type of structure provided with two fixed reeds, that is, normally-closed contact 41 and normally-open contact 42, allows a single shock sensor 40 to be used as a normally-closed type and a normally-open type. Furthermore, two levels of acceleration may be detected since movable reed 13 estranges from normally-closed contact 41 when the acceleration due to a shock exceeds a first value and movable reed 13 presses against normally-open contact 42 when the acceleration due to a shock exceeds a second value. Hence, the size of the detected acceleration may be arbitrarily set by appropriately adjusting the gap between normally-closed contact 41 and normally-open contact 42.

Figure 5:
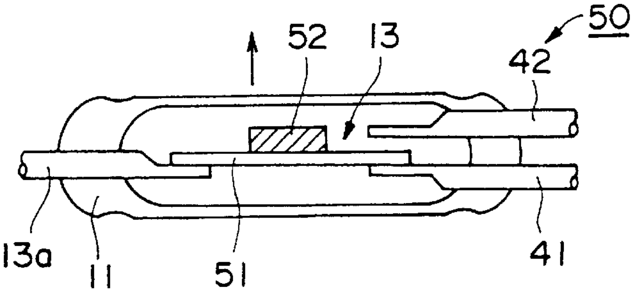
FIG. 5 is a sectional view illustrating a fifth embodiment of the shock sensor according to the present invention.

FIG. 5 illustrates a fifth embodiment of a shock sensor according to the present invention. In FIG. 5, the structure of a shock sensor 50 is a variation of shock sensor 40 shown in FIG. 4 and comprises a supporting member 51 and a weight member 52 as substitutes for supporting member 13*b* and weight member 13*c*.

In such case, supporting member 51 extends as far as the vicinity of the tip of fixed reeds 41 and 42 and, together with the contact being structured on the surface thereof Weight member 52 is installed near the center of supporting member 51. Therefore, weight member 52 is structured separately from the contact.

Shock sensor 50 with this type of structure functions in the same manner as shock sensor 40 shown in FIG. 4.

Figure 6:
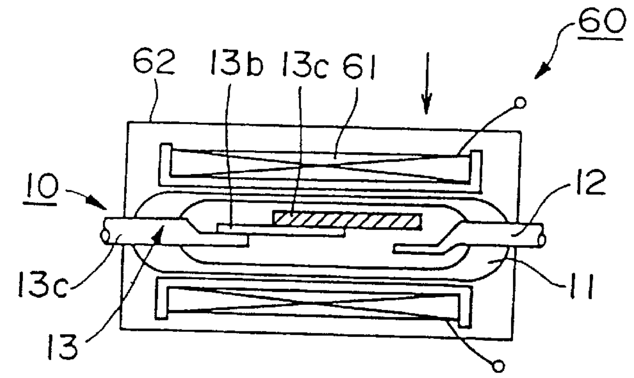
FIG. 6 is a sectional view illustrating a sixth embodiment of the shock sensor according to the present invention.

FIG. 6 illustrates a sixth embodiment of the shock sensor according to the present invention. In FIG. 6, a shock sensor 60 is constructed by adding a coil 61 and a housing 62 to shock sensor 10 shown in FIG. 1. Coil 61 is placed around the lengthwise axis of hermetically sealed case 11 so as to encircle it. Coil 61 is connected to a power source not shown. Housing 62 is formed so as to encircle shock sensor 10 and coil 61, and may be a resin mold. In such a construction, fixed reed 12 and movable reed 13 are respectively structured of magnetic materials.

This construction functions in the same manner as shock sensor 10 shown in FIG. 1. In addition, the features of shock sensor 10 may be tested by providing an electric current to coil 61. The contact of movable reed 13 presses against the contact of the fixed reed 12 pursuant to the magnetic force generated to coil 61. This enables testing of the opening and closing motion between the contact of fixed reed 12 and the contact of movable reed 13. In such case, the shock sensor may be structured to be small since coil 61 does not move against hermetically sealed case 11 at the inner side thereof.

Figure 7:
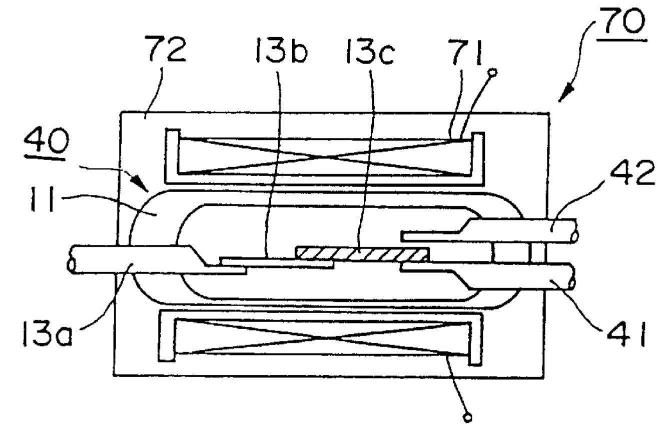
FIG. 7 is a sectional view illustrating a seventh embodiment of the shock sensor according to the present invention.

FIG. 7 illustrates a seventh embodiment of a shock sensor according to the present invention. In FIG. 7, a shock sensor 70 is constructed by adding a coil 71 and a housing 72 to shock sensor 40 shown in FIG. 4.

Coil 71 is placed around the lengthwise axis of hermetically sealed case 11 as to encircle it and is connected to a power source not shown. Housing 72 is formed so as to encircle shock sensor 40 and coil 71, and is preferably a resin mold.

This construction functions in the same manner as shock sensor 40 shown in FIG. 4. In addition, the features of shock sensor 40 may be tested by providing an electric current to coil 71. The contact of movable reed 13 estranges from normally-closed contact 41 of the fixed reed and presses against normally-open contact 42 pursuant to the magnetic force generated to the coil 71. This enables testing of the opening and closing motions between normally-closed contact 41 and normally-open contact 42 of the fixed reed. In such case, shock sensor 70 may be structured to be small since coil 71 does not move against hermetically sealed case 11 at the inner side thereof.

Figure 8:
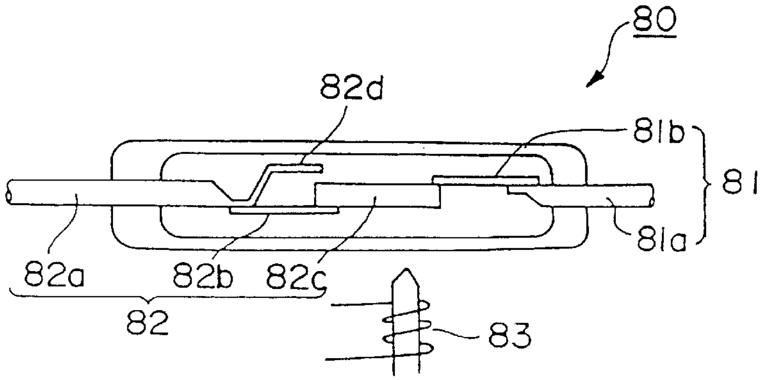
FIG. 8 is a sectional view illustrating an eighth embodiment of the shock sensor according to the present invention.

FIG. 8 illustrates an eighth embodiment of a shock sensor according to the present invention. In FIG. 8, the structure of a shock sensor 80 differs from shock sensor 30 shown in FIG. 3 in that at least the contact of a fixed reed 81 is made of a nonmagnetic material and the supporting member of a movable reed 82 is made of a nonmagnetic material.

Fixed reed 81 comprises a base 81*a* made of a magnetic material, such as Permalloy, fixed and held by hermetically sealed case 11, and a contact 81*b* made of a nonmagnetic material, such as phosphor bronze, fitted by being welded or other appropriate methods at the tip positioned within hermetically sealed case 11.

In accordance with FIG. 8, movable reed 82 comprises a base 82*a* made of a magnetic material, such as Permalloy, fixed and held by hermetically sealed case 11, a supporting member 82*b* made of a nonmagnetic material, such as phosphor bronze, fitted at the tip of base 82*a* positioned within the hermetically sealed case 11, and a weight member 82*c* made of a magnetic material, such as Permalloy, fitted at the tip of supporting member 82*b*. The contact (not shown) is formed in the area opposing contact 81*b* of fixed reed 81 on the surface near the tip of weight member 82*c*.

In such a construction, movable reed 82 also includes a thin-bodied protrusion 82*d* at the tip of base 82*a* which extends as far as the vicinity of the weight member 82*c*. Protrusion 82*d* is made of the same magnetic material as base 82*a* and its purpose is to create a slight magnetic circuit between base 82*a* and weight member 82*c*.

Moreover, shock sensor 80 comprises an excitation coil 83 on the outside of hermetically sealed case 11 opposing weight member 82*c* of movable reed 82.

According to this type of structure, the workings of shock sensor 80 will be the same as normally-closed shock sensor 30 shown in FIG. 3. In addition, even though a strong magnetic field is acting from the outside, the magnetic path running through fixed reed 81 and movable reed 82 will not close because supporting member 82*b* of movable reed 82 is made of a nonmagnetic material. Therefore, even when a strong magnetic field is acting from the outside, an accurate shock detection is performed without movable reed 82 being magnetically absorbed by fixed reed 81.

Moreover, by providing an electric current to excitation coil 83, the magnetic field generated to the excitation coil 83 magnetically excites weight member 82*c* of movable reed 82 and makes the contact thereof estrange from contact 81*b* of fixed reed 81. This provides for testing of the opening and closing motion between fixed reed 81 and movable reed 82, thereby enabling the confirmation of the features thereof In such case, the shock sensor may be structured to be small since excitation coil 83 does not move against hermetically sealed case 11 at the inner side thereof.

Figure 9:
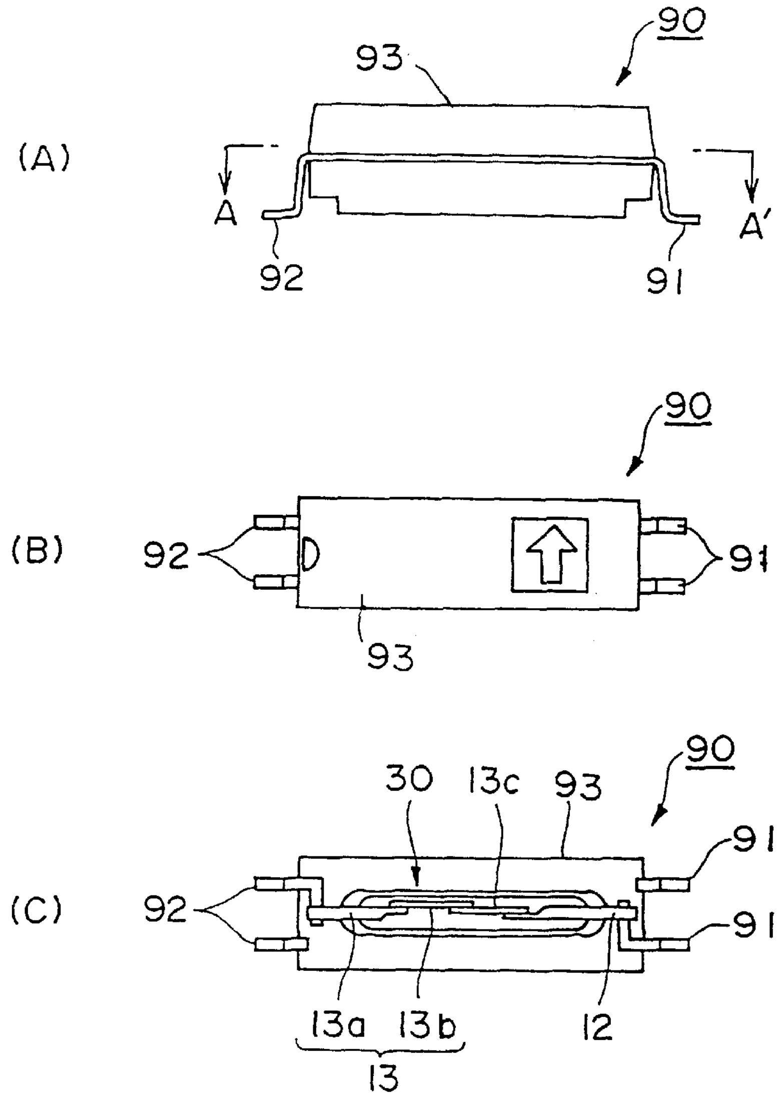
FIG. 9A is a side view illustrating a ninth embodiment of the shock sensor according to the present invention.
FIG. 9B is a plan view illustrating a ninth embodiment of the shock sensor according to the present invention.
FIG. 9C is a sectional view illustrating a ninth embodiment of the shock sensor according to the present invention.
Figure 10:
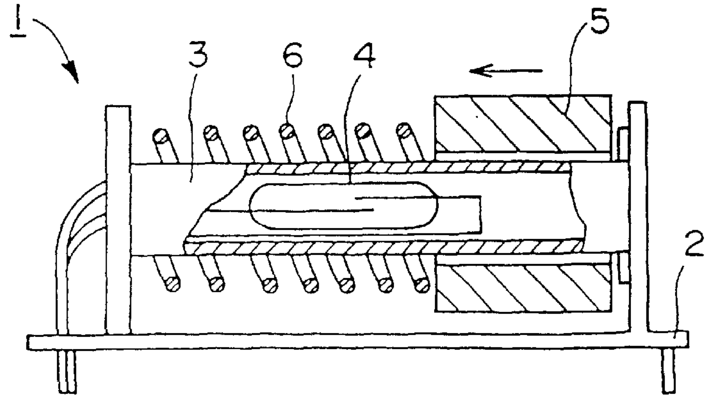
FIG. 10 is a sectional view illustrating one example of a conventional shock sensor.

FIGS. 9A, 9B, and 9C illustrate a ninth embodiment of the shock sensor according to the present invention. The structure of a shock sensor 90 according to a ninth embodiment of the present invention differs from shock sensor 30 shown in FIG. 3 in that the connecting terminals protruding to the outside of fixed reed 12 and movable reed 13 are respectively connected to reed frames 91 and 92, and the entirety is covered with a resin mold 93 to form a package.

Shock sensor 90 functions in the same manner as shock sensor 30 shown in FIG. 3. In addition, the portions protruding toward the outside from resin mold 93 of reed frames 91 and 92 are pressed against the leads to provide connection on the surface of the printed board (not shown). Shock sensor 90 may be directly mounted on the surface of printed boards, and the like, by soldering, such as reflow soldering.

In addition, regarding the above-mentioned embodiments, by at least a portion of the fixed reed and the movable reed being structured of the same material, the rate of expansion by heat will be substantially equal thereby simplifying the heat processing step for sealing hermetically sealed case 11.

As mentioned above, according to the present invention, if for example the shock sensor is installed in the body of an automobile and the shock sensor is suddenly stopped, the movable reed moves in the direction of the shock with certainty by the inertial mass of the weight member or, more preferably by, the elastic deformation of the supporting member made of spring. And by the contact of the tip the movable reed being pressed against or estranged from the opposing contact of the fixed reed, the “on”/“off” between the fixed reed and the movable reed is switched.

Therefore, this switching to the “on” or “off” position between the fixed reed and the movable reed is detected by the likes of detection devices (control devices) of passenger protection systems, such as airbags and seatbelts. These systems detect that the automobile has been subject to a shock, and activate the likes of airbag and seatbelt systems with certainty.

In such case, since the shock sensor will only be constructed of a hermetically sealed case and a fixed reed and a movable reed, only a few parts are required and the cost of parts and the assembly thereof is reduced.

Furthermore, by appropriately selecting the weight of the weight member and the elastic modulus of the supporting member, a desired detection acceleration may be easily set.

Thus, according to the present invention, a superior shock sensor is provided which is easy to assemble by the structure being small and simple.

What is claimed is:

1. A shock sensor comprising:

a hermetically sealed case extending along a direction substantially perpendicular to a direction in which a shock is to be detected; and a fixed reed and a movable reed sealed inside said hermetically sealed case so as to extend in a lengthwise direction of said hermetically sealed case;

wherein said movable reed includes a weight member and a supporting member which elastically supports said weight member, so that when said weight member moves in said detected direction due to said shock, a contact of a tip of said weight member presses against or estranges from a contact of a tip of said fixed reed, thereby opening or closing a space between said fixed reed and said movable reed; and wherein a surface of said weight member forms said contact of a tip of said weight member; and wherein said fixed reed comprises two fixed reeds, each having contacts placed at prescribed intervals, such that when said weight member of said movable reed moves in the detected direction due to a shock, said contact member installed at said tip of said weight member estranges from said contact of one of said two fixed reeds and presses against said contact of the other of said two fixed reeds; and wherein said weight member of said movable reed and one of said two fixed reeds are made of a magnetic material and the other said two fixed reeds is made of a nonmagnetic material.

2. The shock sensor according to claim 1, wherein said supporting member is a spring.

3. The shock sensor according to claim 1, wherein said supporting member is integral with a base of said movable reed that is fixed and held by said hermetically sealed case.

4. A shock sensor comprising:

a hermetically sealed case extending along a direction substantially perpendicular to a direction in which a shock is to be detected;

a fixed reed and a movable reed sealed inside said hermetically sealed case so as to extend in a lengthwise direction of said hermetically sealed case, wherein said movable reed includes a weight member and a supporting member which elastically supports said weight member, so that when said weight member moves in said detected direction due to said shock, a contact of a tip of said weight member presses against or estranges from a contact of a tip of said fixed reed, thereby opening or closing a space between said fixed reed and said movable reed; and a coil placed around a lengthwise axis of said hermetically sealed case so as to encircle said hermetically sealed case, wherein testing is performed by making said contact of said movable reed estrange from or press against said contact of said fixed reed pursuant to a magnetic force generated to the coil by providing current to said coil.

5. A shock sensor according to claim 4, wherein said contact of the fixed reed is made of a nonmagnetic material.

6. The shock sensor according to claim 4, which is a normally-closed type, wherein said contact tip of said weight member is normally pressed against said contact of said fixed reed.

7. A shock sensor according to claim 4, which is a normally-open type, wherein said contact of said tip of said weight member is normally estranged from said contact of said fixed reed.

8. The shock sensor according to claim 4, wherein said supporting member is a spring.

9. The shock sensor according to claim 4, wherein said supporting member is integral with a base of said movable reed that is fixed and held by said hermetically sealed case.

10. A shock sensor according to claim 4, wherein a surface of said weight member comprises said contact tip of said weight member.

11. A shock sensor according to claim 4, wherein said supporting member comprises a contact.

12. A shock sensor comprising:

a hermetically sealed case extending along a direction substantially perpendicular to a direction in which a shock is to be detected;

a fixed reed and a movable reed sealed inside said hermetically sealed case so as to extend in a lengthwise direction of said hermetically sealed case, wherein said movable reed includes a weight member and a supporting member which elastically supports said weight member, so that when said weight member moves in said detected direction due to said shock, a contact of a tip of said weight member presses against a contact made of non-magnetic material of a tip of said fixed reed, thereby closing a space between said fixed reed and said movable reed; and an excitation coil placed at the outside of said hermetically sealed case adjacent to the contact of said movable reed, thereby enabling testing by providing an electric current to said excitation coil and magnetically exciting said movable reed.

13. The shock sensor according to claim 12, wherein said supporting member is a spring.

14. The shock sensor according to claim 12, wherein said supporting member is integral with a base of said movable reed that is fixed and held by said hermetically sealed case.

15. A shock sensor according to claim 12, wherein a surface of said weight member comprises said contact tip of said weight member.

16. A shock sensor according to claim 12, wherein said supporting member comprises a contact.

17. A shock sensor comprising:

a hermetically sealed case extending along a direction substantially perpendicular to a direction in which a shock is to be detected, said hermetically sealed case being installed in a reed frame and covered with resin mold so as to be formed into a package; and a fixed reed and a movable reed sealed inside said hermetically sealed case so as to extend in a lengthwise direction of said hermetically sealed case;

wherein said movable reed includes a weight member and a supporting member which elastically supports said weight member, so that when said weight member moves in said detected direction due to said shock, a contact of a tip of said weight member presses against or estranges from a contact of a tip of said fixed reed, thereby opening or closing a space between said fixed reed and said movable reed.

18. The shock sensor according to claim 17, which is a normally-closed type, wherein said contact tip of said weight member is normally pressed against said contact of said fixed reed.

19. A shock sensor according to claim 17, which is a normally-open type, wherein said contact of said tip of said weight member is normally estranged from said contact of said fixed reed.

20. The shock sensor according to claim 17, wherein said supporting member is a spring.

21. The shock sensor according to claim 17, wherein said supporting member is integral with a base of said movable reed that is fixed and held by said hermetically sealed case.

22. A shock sensor according to claim 17, wherein a surface of said weight member comprises said contact tip of said weight member.

23. A shock sensor according to claim 17, wherein said supporting member comprises a contact.

* * * * *